United States Patent
Brolund

[11] Patent Number: 5,839,523
[45] Date of Patent: Nov. 24, 1998

[54] METHODS AND APPARATUS FOR LUBRICATING A ROTARY CUTTER

[75] Inventor: Stig-Åke Brolund, Houston, Tex.

[73] Assignee: Sandvik AB, Sandviken, Sweden

[21] Appl. No.: 909,659

[22] Filed: Aug. 12, 1997

Related U.S. Application Data

[63] Continuation of PCT/SE96/00185, Feb. 13, 1996.

[51] Int. Cl.$^6$ ................................................. E21B 10/22
[52] U.S. Cl. .......................................... 175/228; 175/371
[58] Field of Search ................................. 175/228, 229, 175/227, 372, 371; 384/93

[56] References Cited

U.S. PATENT DOCUMENTS

| | | | |
|---|---|---|---|
| 1,909,128 | 5/1933 | Scott et al. | 175/228 |
| 3,244,459 | 4/1966 | Ortloff | 175/229 X |
| 4,183,416 | 1/1980 | Walters | 175/228 X |
| 4,887,675 | 12/1989 | Shotwell | 175/228 |
| 5,363,930 | 11/1994 | Hern | 175/228 |
| 5,485,890 | 1/1996 | Cawthorne et al. | 175/228 |
| 5,558,172 | 9/1996 | Millsopps, Jr. | 175/228 |

*Primary Examiner*—Frank Tsay
*Attorney, Agent, or Firm*—Burns, Doane, Swecker & Mathis, L.L.P.

[57] ABSTRACT

A rotary cutter includes a shaft adapted to be mounted on a support and defining a longitudinal axis. The shaft includes a bore extending inwardly into the shaft, and a channel extending into the shaft and intersecting the bore. A roller body, having cutting elements, is mounted on the shaft for rotation relative thereto about the axis. Bearings are disposed between the roller body and the shaft, the bearings communicating with the bore. The cutter is lubricated by inserting a filling plug into the bore and forcing lubricant therethrough and into the bearings. The filling plug is then removed from the bore, leaving the bore generally free of lubricant. A hollow cylindrical member and a flexible diaphragm are inserted into the bore, and a nozzle is inserted through the channel for introducing lubricant into the bore. The nozzle is then removed from the channel, and the channel is plugged. The diaphragm flexes inwardly and outwardly in response to variations in external and internal pressures.

10 Claims, 4 Drawing Sheets

METHODS AND APPARATUS FOR LUBRICATING A ROTARY CUTTER

RELATED INVENTION

This is a continuation application of International Application Serial No. PCT/SE96/00185 filed on Feb. 13, 1996.

BACKGROUND OF THE INVENTION

The present invention relates to a cutter for a boring head, preferably a boring head for shaft drilling, wherein the cutter is rotatably mounted, via a shaft of the cutter, in a saddle secured to the boring head and wherein bearings are provided between the shaft and an outer roller body of the cutter to make it possible for the roller body to rotate relative to the shaft, wherein seals are disposed between the shaft and the roller body and channels/holes are provided to introduce lubrication into the bearings. The invention further relates to a method for filling a lubrication system.

When cutters of the type mentioned above are working it is necessary that the bearings are embedded in a lubricant, preferably grease, i.e., the space between the shaft and the cutter is filled with grease. This is done in order to minimize the friction when the roller body is rotated relative to the shaft. By having a low internal friction in the bearings, the life of the cutter is kept at an acceptable level. However, it has turned out that under very tough working conditions, i.e., when the cutter is subjected to a heavy load, much heat is generated by rotation of the roller body relative to the shaft and by friction as the cutter works the rock. Due to the heat generation the grease expands and the internal pressure of the cutter rises. Under such conditions, it occasionally happens that the internal pressure of the cutter reaches a level where the seal means are not able to withstand said internal pressure, i.e., the seals collapse and the grease emerges from the bearings. It is readily understood that if the seals collapse then the cutter will rapidly breakdown.

From German Patent 27 42 019 a cutter for a tunnel boring machine is previously known, the cutter being equipped with pressure relief valves connected to certain ends of the internal grease passages. Other ends of the internal grease passages are equipped with nipples for introducing grease into the internal grease passages. The function of the pressure relief valves is to allow passage of excessive grease both when grease is primarily introduced into the interior of the cutter as well as when regreasing of the cutter is effected. However, if the cutter according to DE-PS 27 42 019 is subjected to heavy loads and consequently a thermal expansion of the grease takes place, the pressure will increase until the pressure relief valves open. Thus, it is absolutely necessary that the valves function properly to avoid damage primarily to the seals and subsequently to the bearings. It is well known that the working conditions of cutters are extremely tough and that a considerable amount of dirt/cuttings adhere to the cutter. Therefore, there is considerable risk of the pressure relief valves becoming clogged and consequently not opening at their nominal pressure.

Other prior art devices of this kind are often subjected to disadvantages such as making it impossible to insert additional grease after a period of use of the cutter or making it impossible to avoid the creation of air pockets during grease refilling, whereby the air content in the grease system can be up to 15%.

OBJECTS AND SUMMARY OF THE PRESENT INVENTION

An object of the present invention is to provide a cutter with pressure compensation that can be used under extremely tough working conditions, e.g., when the cutter is surrounded by fluid which pressurizes the seals in the cutter and when heat is generated inside the cutter and the grease expands.

Another object of the present invention is to provide an effective method to fill a grease system with a maximum volume of grease, i.e., only a minimum of air bubbles will remain in the system after filling.

These and other objects of the present invention are realized by a rotary cutter comprising a shaft adapted to be mounted on a support and defining a longitudinal axis. The shaft includes a first bore extending inwardly into the shaft from a first port at an outer surface of the shaft, and a second bore extending from the first bore to a second port at an outer surface of the shaft. An outer roller body is mounted on the outer surface of the shaft for rotation relative thereto about the axis. The second port is situated between the shaft and the roller body. An axial locking means is disposed between the shaft and roller body for locking the roller body against axial movement relative to the shaft. The second bore communicates with the axial locking means at the second port. Bearings are disposed between the shaft and the roller body for rotatably mounting the roller body on the shaft. The bearings communicate with the second port. A spacer is disposed in the second bore for spacing the locking means from the first bore. A retainer is disposed in the first bore and extends across the second bore sufficiently to retain the spacer therein, while maintaining communication between the first and second bores. A flexible diaphragm is disposed adjacent an outer end of the retainer for forming a grease seal across the first bore. The first and second bores and the bearings contain lubricating grease. The flexible diaphragm is flexible inwardly in response to an increase in external pressure applied thereto from the first port, and is flexible outwardly in response to thermal expansions of grease.

A method aspect of the invention involves inserting lubricant into a rotary cutter, the cutter including a shaft adapted to be mounted on a support and defining a longitudinal axis. The shaft includes a bore extending inwardly into the shaft, and a channel extending into the shaft and intersecting the bore. A rotary body is mounted on the shaft for rotation relative thereto about the axis. Bearings are disposed between the rotary body and the shaft, the bearings communicating with the bore. The method comprises the steps of:

A) inserting a filling plug into the bore;
B) forcing lubricant through and out of the filling plug and into the bearings;
C) removing the filling plug from the bore;
D) securing within the bore:
  D1) a hollow cylindrical member, and
  D2) a flexible diaphragm forming a lubricant seal across the bore outwardly of the cylindrical member and outwardly of a point of intersection between the bore and the channel;
E) inserting a nozzle through the channel;
F) forcing lubricant through the nozzle and into the bore;
G) removing the nozzle from the channel; and
H) plugging the channel.

BRIEF DESCRIPTION OF THE DRAWINGS

Below, an embodiment of a preferred cutter according to the present invention is described, reference being made to the accompanying drawings, wherein.

DETAILED DESCRIPTION OF A PREFERRED EMBODIMENT OF THE INVENTION

Figure 1:
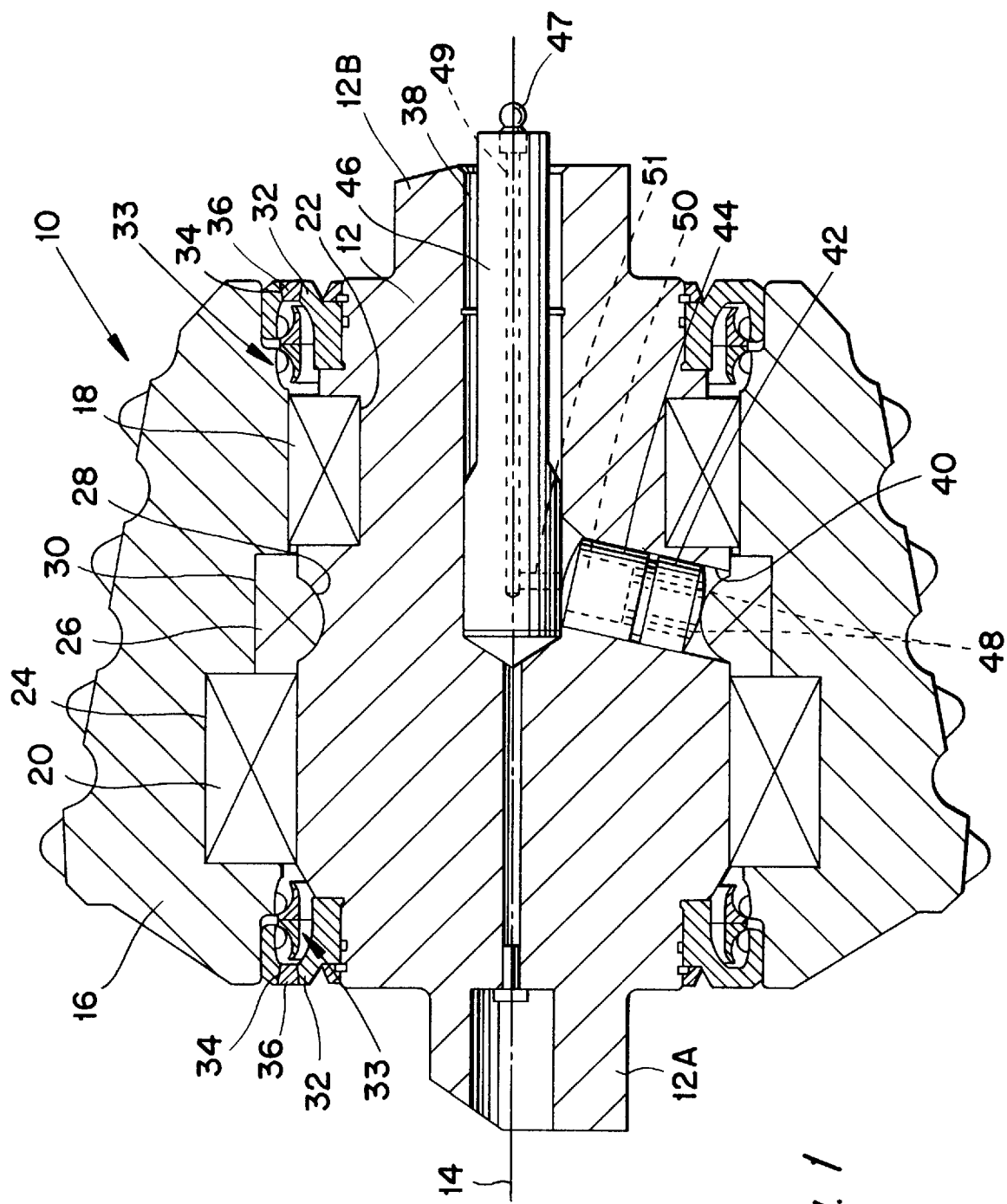
FIG. 1 shows a cross-section through a cutter when grease is introduced into and in the vicinity of the bearing races of the cutter.

The cutter 10 according to FIG. 1 includes a shaft 12 having a longitudinal center axis 14. The ends 12A and 12B of the shaft 12 are to be mounted in a saddle (not shown), which is secured to a boring head. A roller body 16 is rotatably mounted on the shaft 12 via two sets of bearings 18 and 20, respectively. The roller body 16 carries cutting elements 16A such as carbide buttons. The bearings 18 are received in a first circumferential groove 22 formed in an outer periphery of the shaft 12, while the bearings 20 are received in a second circumferential groove 24 formed in an inner periphery of the roller body 16. The roller body 16 is locked axially relative to the shaft 12 by locking means 26, preferably including an annular row of balls cooperating with third and fourth circumferential channels or grooves 28 and 30, formed respectively in the outer surface of the shaft 12 and in the roller body 16.

Between the axial ends of the roller body 16 and the shaft 12, the cutter 10 is provided with seal retainer means 32 for supporting seals 33 that prevent grease from leaking out from the interior of the cutter 10. Both seal retainer means 32 are equipped with first relief holes 34 in which conical plugs 36 are mounted to prevent grease from leaking out through the holes 34. The function of the first relief holes 34 is explained more in detail below.

The cutter 10 according to FIG. 1 is provided with an axial first bore 38 that extends from one end or port 12B of the shaft 12, i.e., in the disclosed embodiment it extends from the end of the shaft 12 where the roller body 16 has its smallest outer diameter. The axial bore 38 extends about halfway of the length of the shaft 12. In the vicinity of the inner end of the bore 38, a generally radial second bore 40 extends from the axial bore 38 to the third groove 28 to form a second port with the outer surface of the shaft 12. The bore 40 is used to install the balls of the locking means 26. When the balls have been installed, a ball plug 42 and a spacer plug 44 are mounted in the bore 40. Both of the plugs 42 and 44 are situated between the balls of the locking means 26 and a filling plug 46, which plug 46 is inserted into the axial bore 38 by a slide fit. For access reasons, the filling plug 46 extends out of the bore 38 and is provided with a grease nipple 47 and an internal axial feeding hole 49 that extends from the nipple 47 to the opposite end portion of the filling plug 46. A radially extending discharge hole 51 emanates from the feeding hole 49 and perforates the envelope surface of the filling plug 46.

The ball plug 42 is provided with two axially extending holes 48 which are offset from the longitudinal center axis of the ball plug 42, while the spacer plug 44 is provided with one axially extending central hole 50 that communicates with both of the holes 48. The reason why the holes 48 of the ball plug 42 are offset from the axis of the plug 42 is to prevent the area of contact between the balls of the locking means 26 an the ball plug from blocking the entry of grease into the locking means 26 and further into the bearings 18, 20.

In FIG. 1 the cutter 10 is shown in a first position for being greased or regreased. It should be noted that greasing takes place in two separate steps. The filling plug 46 is inserted into the axial bore 38 of the shaft 12. A grease gun (not shown) is attached to the grease nipple 47 and grease is pumped into the cutter by the grease gun. Thereby grease is forced through the channels 49 and 51 in the filling plug such that grease is forced out through an orifice in the plug and into the races 28 and 30, between the shaft 12 and the hub 16 carrying the bearings 26. The filling plug has such geometry that its inner end fits snugly against a wall of the bore 38 to prevent an axial flow of grease and therefore the plug will not be subjected to axial reaction forces during filling. The first relief holes 34 are used to control the level of the grease inside the cutter 10. That is, excess grease is forced through the holes 34 when the first step of filling is completed. Then the filling plug is retracted from the bore and the bore is substantially grease-free. The conical plugs 36 are mounted in the first relief holes 34 when the first step of greasing or regreasing is completed.

Figure 4:
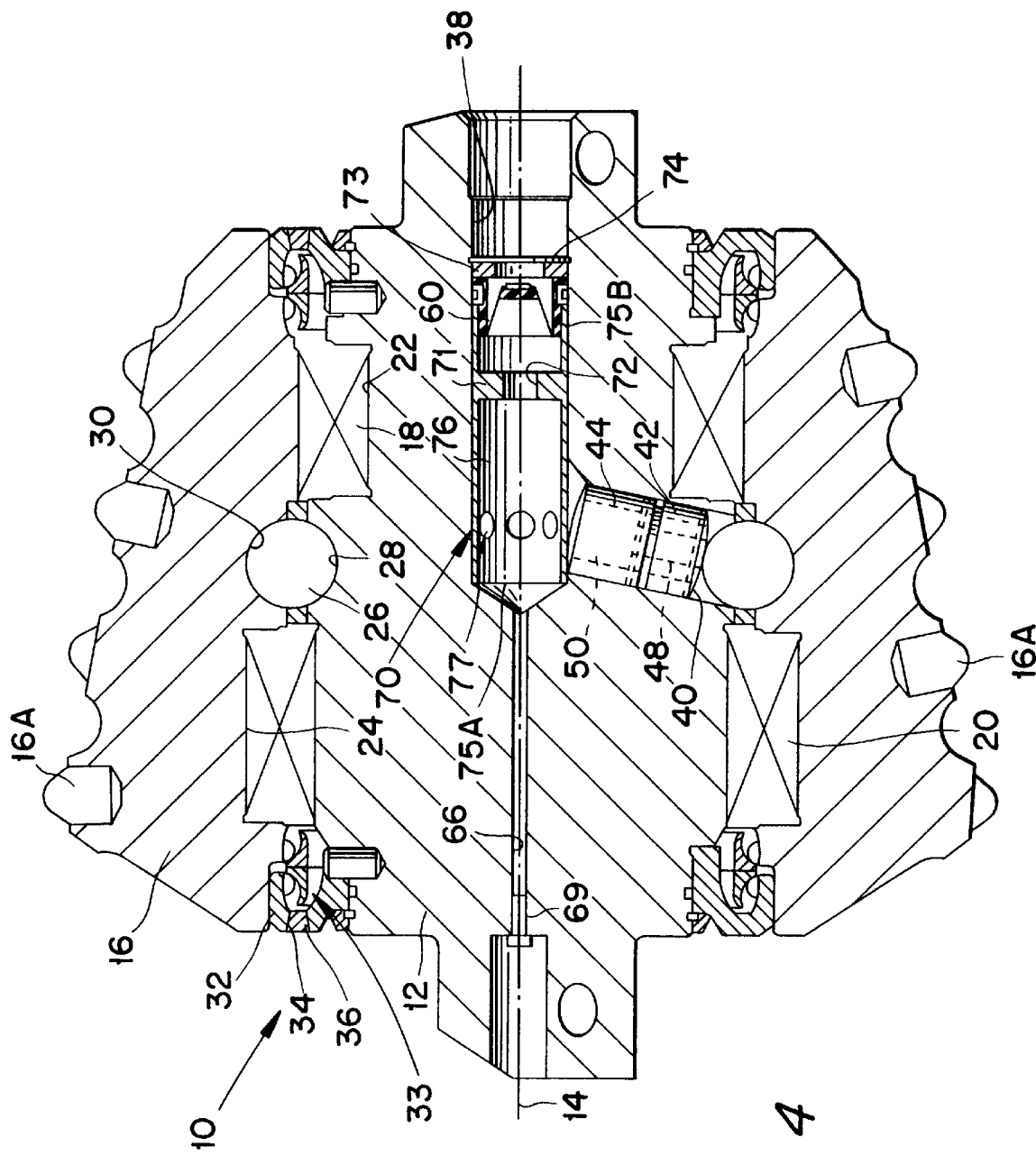
FIG. 4 shows a cross-section through a cutter according to the invention, in an active position.

A device or a retainer 70 for the plug 44, see for instance FIG. 4, which is hollow and has a shorter length than the filling plug 46, is inserted into the bore 38. The retainer 70 for the spacer plug 44 is arranged with clearance fit (i.e., loosely) in the bore 38. The retainer 70 includes a cylinder, which is substantially thin walled in order to contain much grease primarily internally but is preferably surrounded by grease due to the clearance fit. The retainer has an inwardly extending flange 71. The flange has two objects, to strengthen the retainer and to stop the inward flexing of a flexible diaphragm 60 under the action of external pressures, such that the yield point of the diaphragm cannot be reached at high external pressures. The flange includes an inner periphery of reduced inner diameter to form a central hole 72 which allows the passage of grease. A number of holes 77 are arranged in the retainer in the vicinity of the bore 40 to allow communication between the bore 40 and an internal space 76 of the retainer.

Figure 3:
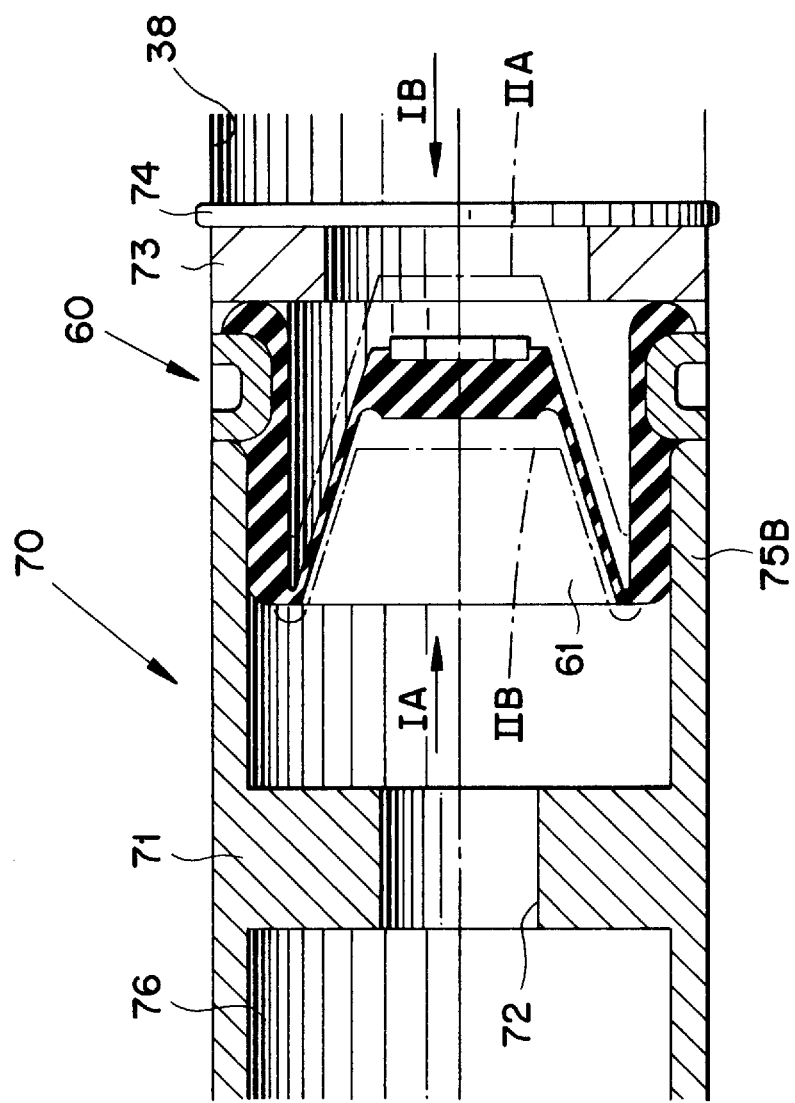
FIG. 3 shows a cross-section through a flexible diaphragm of the cutter.

A bellows or flexible diaphragm 60 in FIG. 3, known from German Patent 28 24 124, is provided in the bore 38 outwardly of the retainer 70 to form a grease seal across the bore 38. The diaphragm has a circular basic shape and its largest diameter corresponds substantially to the diameter of the bore 38 and engages a wall thereof. In the mounted position the diaphragm has the same diameter as the part of the bore which holds the retainer. One end 75A (FIG. 4) of the retainer is brought into contact with the bottom (i.e., inner end) of the bore, and the diaphragm is brought against an outer end 75B of the retainer. Then the retainer and bore are secured against relative axial displacement by means of a centrally hollow washer 73 and a snap ring 74. The diaphragm preferably projects axially into the retainer. The diaphragm is provided to even-out the pressure differences that develop as internal pressures during temperature increases in the grease or that develop as external pressures during work performed in holes filled with deep water. The diaphragm separates the grease from the fluid in the bore hole, which fluid enters into the outer orifice of the bore 38 and through the snap ring 74 and the washer 73. The retainer 70, the grease channel 66 and the diaphragm 60 are provided in the shaft 12, substantially concentrically with the center axis 14.

Figure 2:
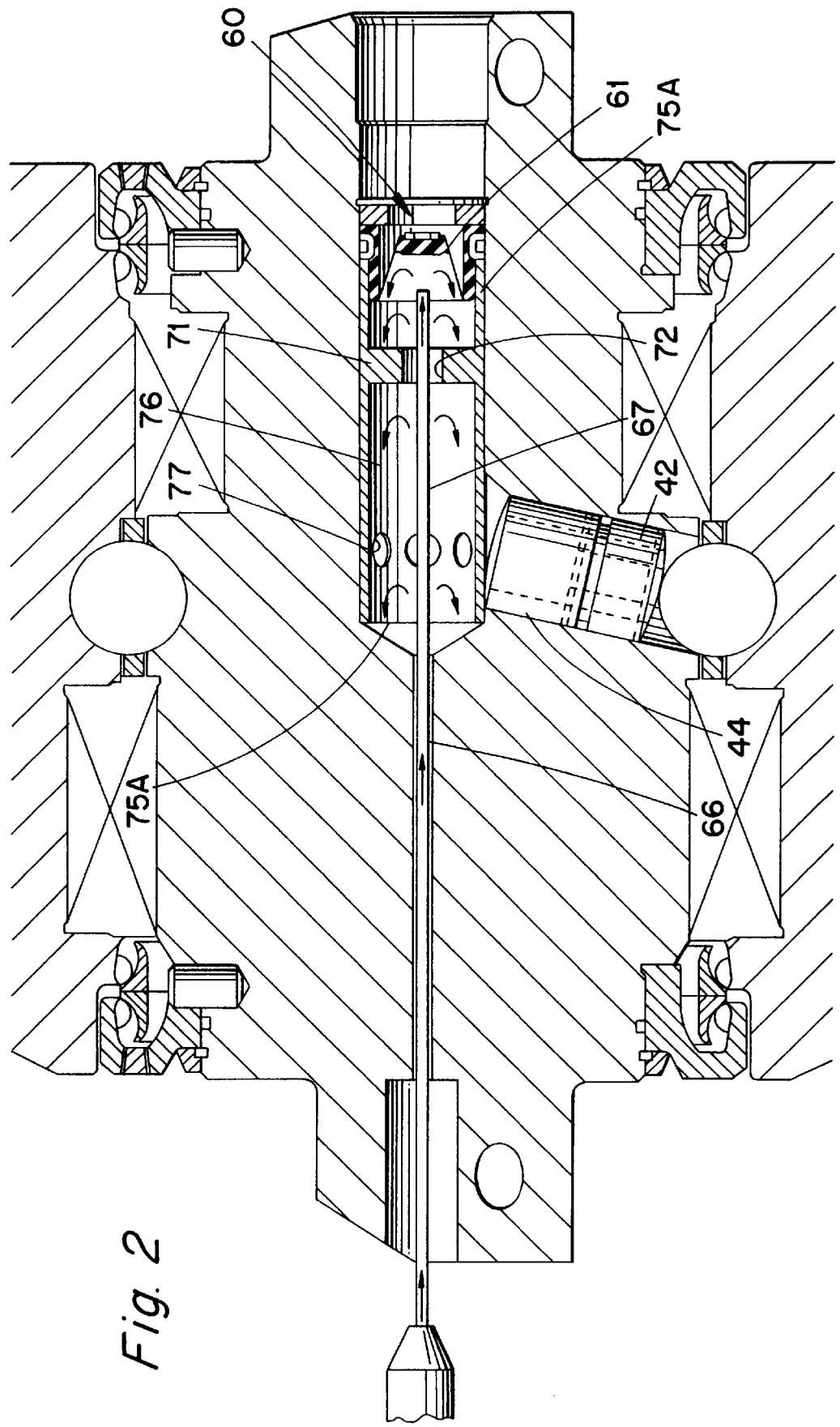
FIG. 2 shows a cross-section through a cutter according to the invention when grease is introduced centrally into the cutter.

The cutter 10 is shown in FIG. 2 during the second step of greasing or regreasing. A nozzle 67 of a grease gun is inserted in and through the channel 66 and through the central hole 72, whereafter the free end of the nozzle is positioned at or in the vicinity of the movable part 61 of the flexible diaphragm. A precondition for filling is that the grease channel 66, the retainer 70 and the diaphragm 60 are substantially concentrical with the center axis 14. Then grease is pumped inwardly such that it fills the part 61. As the space around the free end of the nozzle is filled, a counter-pressure is created on the nozzle 67 and the nozzle is pushed outwardly. The operator of the grease gun then realizes that the inner parts of the bore 38 are filled and thus releases the feed pressure on the gun such to allow the gun to be pushed back by the grease during continuous filling of grease, i.e., the reactional forces from the grease on the nozzle control the retraction speed of the nozzle.

The nozzle 67 is removed when it has been fully pushed out of the grease channel 66, which is now filled. The channel is then sealed by a screw plug 69 or a similar seal means, see FIG. 4. The complete grease system contains less than 5% air.

The cutter 10 according to the present invention functions in the following way. When a cutter 10 is set under working conditions it rotates and is subjected to heavy loads. This means in a first case, that friction generates heat in the bearings 18, 20 and the locking means 26 of the cutter 10 and consequently also the grease is heated and expands. In a second case, the grease is compressed due to a high external pressure from the fluid in the bore hole.

In the first case, when the grease is heated, it expands and since the seal retainers 32 prevent grease from leaking out between the roller body 16 and the shaft 12, the grease will push the movable part 61 of the diaphragm in the direction of the arrow IA in FIG. 3 to the position IIA. In the second case, the cutter is surrounded by fluid under a relatively high pressure and therefore the volume of the grease system will diminish due to displacement of the part 61 in the direction of the arrow IB to the position IIB to achieve the same internal pressure as externally. These movements of the part 61 occur continuously during the drilling or during sinking into fluid, and the positions shown in FIG. 3 shall be seen as examples only. Essentially less or larger changes in volume are possible, such as for instance a volume change in the interval ±5% relative to the original volume. It is often advantageous to fill at least the diaphragm with grease before inserting the retainer 70, and then completely filling the retainer by means of the nozzle 67.

It is possible to practice the invention in connection with raise boring, cutters/discs for tunnel boring heads or shaft sinking.

Although present invention has been described in connection with a preferred embodiment thereof, it will be appreciated by those skilled in the art that additions, deletions, modifications, and substitutions not specifically described may be made without departing from the spirit and scope of the Invention as defined in the appended claims.

I claim:

1. A rotary cutter comprising:
   a shaft adapted to be mounted on a support and defining a longitudinal axis, the shaft including a first bore extending inwardly into the shaft from a first port at an outer surface of the shaft, and a second bore extending from the first bore to a second port at the outer surface of the shaft;
   an outer roller body having cutting elements being mounted on the outer surface of the shaft for rotation relative thereto about the axis, the second port being situated between the shaft and the roller body;
   an axial locking means disposed between the shaft and roller body for locking the roller body against axial movement relative to the shaft, the second bore communicating with the axial locking means at the second port;
   bearings disposed between the shaft and the roller body for rotatably mounting the roller body on the shaft, the bearings communicating with the second port;
   a spacer disposed in the second bore for spacing the locking means from the first bore;
   a retainer disposed in the first bore and extending across the second bore sufficiently to retain the spacer therein, while maintaining communication between the first and second bores; and
   a flexible diaphragm disposed adjacent an outer end of the retainer for forming a grease seal across the first bore;
   the bearings and first and second bores containing lubricating grease;
   the flexible diaphragm being flexible inwardly in response to external pressure applied thereto from the first port, and flexible outwardly in response to internal thermal expansions of grease.

2. The rotary cutter according to claim 1 wherein the retainer is hollow and substantially cylindrical, the cylinder including an inside diameter which is reduced at a location intermediate inner and outer ends of the retainer.

3. The rotary cutter according to claim 2 wherein the diaphragm includes an outer periphery engaging a wall of the first bore, a portion of the diaphragm extending into the outer end of the retainer.

4. The rotary cutter according to claim 3 further including a locking ring mounted in the first bore outwardly of the diaphragm for securing the retainer and diaphragm within the first bore.

5. The cutter according to claim 1 wherein the retainer is mounted loosely within the first bore.

6. The cutter according to claim 1, wherein the shaft further includes a channel intersecting the first bore at a location inwardly of the diaphragm and communicating the first bore with the outer surface of the shaft at a third port, and a plug removably disposed in the channel.

7. The cutter according to claim 6 wherein the first bore and the channel extend along the axis.

8. The cutter according to claim 1 wherein the retainer is hollow and cylindrical and includes holes disposed at the second bore.

9. A method of inserting lubricant into a rotary cutter, the cutter including a shaft adapted to be mounted on a support and defining a longitudinal axis, the shaft including a bore extending inwardly into the shaft, and a channel extending into the shaft and intersecting the bore, a roller body having cutting elements being mounted on the shaft for rotation relative thereto about the axis, and bearings disposed between the roller body and the shaft and communicating with the bore, the method comprising the steps of:
   A) inserting a filling plug into the bore;
   B) forcing lubricant through the filling plug and into the bearings;
   C) removing the filling plug from the bore, leaving the bore generally free of lubricant;
   D) securing within the bore:
      D1) a hollow cylindrical member, and
      D2) a flexible diaphragm forming a lubricant seal across the bore outwardly of the cylindrical member and outwardly of a point of intersection between the bore and the channel;
   E) inserting a nozzle through the channel;
   F) forcing lubricant through the nozzle and into the bore;
   G) removing the nozzle from the channel; and
   H) plugging the channel.

10. The method according to claim 9 wherein step E comprises inserting the nozzle so that an outlet of the nozzle is disposed adjacent the diaphragm, and step F comprises gradually moving the nozzle away from the diaphragm during the introduction of lubricant.

* * * * *